June 25, 1929.  C. F. SHERWOOD  1,718,386
RUBBER COVERED WOVEN SCREEN
Original Filed Jan. 24, 1922
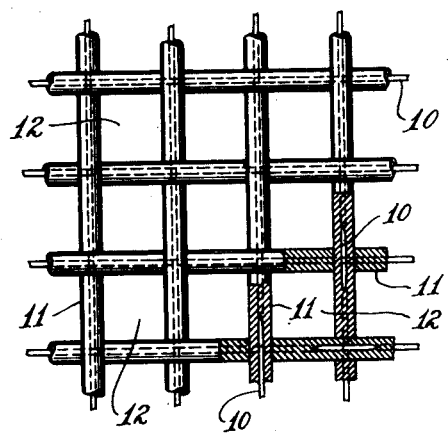
Inventor
Charles Frederick Sherwood
By Eakin & Avery
Attys.

Patented June 25, 1929.

1,718,386

UNITED STATES PATENT OFFICE.

CHARLES FREDERIC SHERWOOD, OF DETROIT, MICHIGAN, ASSIGNOR TO OLIVER-SHERWOOD CO., OF SAN FRANCISCO, CALIFORNIA, A CORPORATION OF CALIFORNIA.

RUBBER-COVERED WOVEN SCREEN.

Original application filed January 24, 1922, Serial No. 531,379. Divided and this application filed December 31, 1928. Serial No. 329,443.

My invention has for its object the production of a screen constructed and adapted to be used for materials which ordinarily have an abrasive or corrosive action upon screens as they have heretofore been made. In the screening of ore, rock, coal and the like, strength in the screen material is required, and this results in the employment of a material which is particularly susceptible to abrasive action. The sharp corners of the matter being screened, cause a cutting action in the steel, bronze or other screen material which results in early destruction. By my screen this destruction is avoided and the life of the screen greatly increased.

Another object is a screen resistant to the corrosive action of acids and alkalis.

These and other objects I accomplish by employing a material of relatively high tensile strength for the body of the screen, fabricated in the form of a woven wire mesh, and surrounding such material with a surface of rubber or other composition having a high elasticity. By the combination of the body material and the elastic material, I produce a screen exceptionally resistant to abrasion or wear. The body material may consist of steel, bronze, or the like, in the form of woven wire, and is for the purpose of adding stiffening or reinforcement to the rubber which entirely surrounds the body material, covering both the screen surface and side walls of the interstices. It will thus be seen that the material of the screen is completely protected against corrosion by acids or alkalis while the rubber surface will at the same time form a cushion for the particles passing through the screen as well as allowing such particles to free themselves because of the elasticity of the rubber walls within the area of the mesh, thus preventing excessive abrasive action as well as corrosion of the material.

A rubber surface is particularly adapted to screening wet or slimy substances. By the use of rubber under such conditions, the liquid acts as a lubricant for the free passage of the substance through the screen with a minimum amount of friction and consequently a relatively long existence for the screen.

The present application is a division of my application, Serial No. 531,379, filed January 24, 1922, which discloses rubber covered screens made with a metallic reinforcement consisting either of a perforated metal or other plate or a woven wire structure. Among the advantages of the rubber covered, metallic, woven screen are lightness and flexibility, greater ease of application of the rubber, and better adhesion of the rubber to the metal as there is less metallic surface to be covered with rubber and smaller apertures are required in the rubber for the accommodation of the metallic reinforcement.

The accompanying drawing is a view partially in elevation and partially in section showing a preferred embodiment of my invention.

In this embodiment, the screen comprises a woven metallic material 10, the entire exposed metallic surface of which is covered with a rubber compound 11, leaving the meshes 12 open for the passage of the material being handled, and bounded completely by rubber.

The holes in the metal screen are of a slightly larger size than the size of the material which it is desired shall pass through the screen. Over the entire surface of the screen I flood, flow, deposit, vulcanize or otherwise coat the metal surface with elastic material such as rubber, the said rubber extending over the surface of the wire structure 10, around the walls of the meshes and over the bottom surface of said structure.

It will be observed that the upper surfaces of the rubber or other elastic material 11 will receive all of the impact and abrasive action of the sharp corners of the particles to be screened, and that the walls of elastic material within the meshes or holes will be exposed to the sharp edges and walls as the particle passes through these holes. The rubber will not be cut by these sharp points but will permit the free passage and ready handling of the sharpest material without cutting, whereas the wire screen 10, if unprotected by the said elastic coating would be rapidly eroded. Where the screen is to be employed with mixtures having an acid or alkaline reaction, it is obvious that the coating of the metallic structure 10 by the rubber will prevent the said corrosion, and even after the rubber surface has partially worn through will greatly retard the said corrosion, thus efficiently prolonging the life of the screen.

I claim:

1. A screen comprising a woven mesh, the entire exposed metallic surface of which is covered with a rubber compound, leaving the meshes open and of a reduced size, bounded completely by rubber.

2. A woven screen for sizing abrasive materials having a coating of rubber serving to protect said screen from the abrasive action of materials handled thereby.

3. A screen for sizing hard materials comprising a fabric composed of spaced wires having a protective layer of a resilient rubber compound thereon adapted to protect the same from abrasive and corrosive action so as to prolong the useful life of the wire fabric.

In witness whereof I have hereunto set my hand this 8 day of December, 1928.

CHARLES FREDERIC SHERWOOD.